United States Patent
Sato et al.

(10) Patent No.: US 11,623,998 B2
(45) Date of Patent: Apr. 11, 2023

(54) WHITE INKJET INK COMPOSITION FOR TEXTILE PRINTING

(71) Applicant: SAKATA INX CORPORATION, Osaka (JP)

(72) Inventors: Yoichi Sato, Osaka (JP); Ayumi Minegishi, Osaka (JP); Hiroyuki Konishi, Osaka (JP); Ryuta Noda, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 461 days.

(21) Appl. No.: 16/639,495

(22) PCT Filed: Aug. 17, 2018

(86) PCT No.: PCT/JP2018/030568
§ 371 (c)(1),
(2) Date: Feb. 14, 2020

(87) PCT Pub. No.: WO2019/039411
PCT Pub. Date: Feb. 28, 2019

(65) Prior Publication Data
US 2021/0047531 A1 Feb. 18, 2021

(30) Foreign Application Priority Data

Aug. 21, 2017 (JP) .............................. JP2017-158880

(51) Int. Cl.
| | | |
|---|---|---|
| C09D 11/38 | (2014.01) | |
| B41M 5/00 | (2006.01) | |
| C09D 11/033 | (2014.01) | |
| C09D 11/037 | (2014.01) | |
| C09D 11/102 | (2014.01) | |
| C09D 11/322 | (2014.01) | |
| D06P 1/52 | (2006.01) | |
| D06P 1/54 | (2006.01) | |
| D06P 5/30 | (2006.01) | |

(52) U.S. Cl.
CPC .......... *C09D 11/38* (2013.01); *B41M 5/0023* (2013.01); *C09D 11/033* (2013.01); *C09D 11/037* (2013.01); *C09D 11/102* (2013.01); *C09D 11/322* (2013.01); *D06P 1/5285* (2013.01); *D06P 1/54* (2013.01); *D06P 5/30* (2013.01)

(58) Field of Classification Search
None
See application file for complete search history.

(56) References Cited

U.S. PATENT DOCUMENTS

| | | | |
|---|---|---|---|
| 2010/0091055 A1* | 4/2010 | Kawakami | B41J 2/18 347/9 |
| 2015/0375528 A1 | 12/2015 | Kitagawa et al. | |
| 2016/0032523 A1 | 2/2016 | Liu et al. | |
| 2016/0311233 A1* | 10/2016 | Murai | B41J 2/2107 |

FOREIGN PATENT DOCUMENTS

| | | |
|---|---|---|
| JP | 2000319351 A | 11/2000 |
| JP | 2006028460 A | 2/2006 |
| JP | 2007217532 A | 8/2007 |
| JP | 2009215506 A | 9/2009 |
| JP | 2010106162 A | 5/2010 |
| JP | 2011105805 A | 6/2011 |
| JP | 2013151600 A | 8/2013 |
| JP | 2014019842 A | 2/2014 |
| JP | 2014148563 A | 8/2014 |
| WO | 2007035505 A1 | 3/2007 |
| WO | 2014039306 A1 | 3/2014 |

OTHER PUBLICATIONS

Notification Concerning Transmittal of International Preliminary Report on Patentability (PCT/IB/326) and Notification of Transmittal of Translation of the International Preliminary Report on Patentability (PCT/IB/338) dated Mar. 5, 2020, with International Preliminary Report on Patentability (PCT/IB/373) and Written Opinion of the International Searching Authority (PCT/ISA/237), for corresponding international application PCT/JP2018/030568 (13 pages).
A First Office Action issued by the State Intellectual Property Office of China dated Oct. 19, 2021 for Chinese counterpart application No. 201880052961.3 (8 pages).
Extended European Search Report (EESR) dated Jul. 21, 2021, issued for European counterpart patent application No. EP18849025.4 (7 pages).
International Search Report (ISR) dated Oct. 30, 2018, issued for International application No. PCT/JP2018/030568. (2 pages).

* cited by examiner

*Primary Examiner* — Katie L. Hammer
(74) *Attorney, Agent, or Firm* — Law Office of Katsuhiro Arai

(57) ABSTRACT

An object is to achieve both good washing fastness and texture by combining a urethane resin of high fracture elongation with a small quantity of crosslinking agent. As a means for achieving the object, a white inkjet ink composition for textile printing is provided that contains a white pigment, a water-dispersible urethane resin having reactivity to cationic compounds, a crosslinking agent, a water-soluble organic solvent, and water; wherein the crosslinking agent is contained by 0.02 to 0.15 parts by mass relative to 1 part by mass of the water-dispersible urethane resin, and as the water-soluble organic solvent, a glycol ether that dissolves by 1 to 60 g in 100 g of water is contained.

1 Claim, No Drawings

WHITE INKJET INK COMPOSITION FOR TEXTILE PRINTING

TECHNICAL FIELD

The present invention relates to a white inkjet ink composition for textile printing.

BACKGROUND ART

White inkjet inks for textile printing, each combining a urethane resin having specific fracture elongation and strength with a crosslinking agent, exist as prior arts; however, they have difficulty achieving both sufficient washing fastness, good texture, and the like, because white inks contain a higher quantity of colorant compared to inks of other colors.

BACKGROUND ART LITERATURE

Patent Literature

[Patent Literature 1] Japanese Patent Laid-open No. 2011-105805

SUMMARY OF THE INVENTION

Problems to Be Solved by the Invention

An object of the present invention is to achieve both sufficient washing fastness and coating film strength as well as good texture by combining a water-dispersible urethane resin with a crosslinking agent and a glycol ether.

Means for Solving the Problems

The inventors studied in earnest to achieve the aforementioned object, and consequently obtained a white inkjet ink composition for textile printing that, as a result of combining a water-dispersible urethane resin with a crosslinking agent and a glycol ether, exhibits sufficient washing fastness and coating film strength as well as good texture.
1. A white inkjet ink composition for textile printing, containing a white pigment, a water-dispersible urethane resin having reactivity to cationic compounds, a crosslinking agent, a water-soluble organic solvent, and water; wherein the crosslinking agent is contained by 0.02 to 0.15 parts by mass relative to 1 part by mass of the water-dispersible urethane resin, and as the water-soluble organic solvent, a glycol ether that dissolves by 1 to 60 g in 100 g of water is contained.
2. A white inkjet ink composition for textile printing according to 1, characterized in that the crosslinking agent is at least one type selected from the group consisting of blocked isocyanate compounds, carbodiimide compounds, and oxazoline group-containing polymers.

Effects of the Invention

According to the white inkjet ink composition for textile printing proposed by the present invention, significant effects in terms of high image density as well as excellent coating film resistance, texture, and washing fastness can be demonstrated by the ink composition that has been printed on a fabric.

Mode for Carrying Out the Invention

The white inkjet ink composition for textile printing proposed by the present invention (hereinafter also referred to as "ink composition proposed by the present invention") is explained in detail below, primarily in regard to its components.

<Water-Dispersible Urethane Resin>

The water-dispersible urethane resin under the present invention has reactivity to cationic compounds. Among such water-dispersible urethane resins, urethane resins having anionic groups are more preferred. Furthermore, the water-dispersible urethane resin is preferably a polyester polyurethane, polyether polyurethane, or polycarbonate polyurethane.

Additionally, among these water-dispersible urethane resins, a resin of 400 to 1200% in fracture elongation and 10 to 70 MPa in tensile strength may be adopted.

When combined with the specific glycol ether described in the present invention, such resin improves texture and washing fastness if its fracture elongation is 400% or more, while it can also prevent deterioration in washing fastness if its fracture elongation is 1200% or less.

Furthermore, if the tensile strength is less than 10 MPa, washing fastness will deteriorate; if the tensile strength exceeds 70 MPa, on the other hand, washing fastness will no longer be sufficient or deteriorate.

It should be noted that the fracture elongation and tensile strength of the water-dispersible urethane resin were obtained under the conditions described below.

The water-dispersible urethane resin was applied onto a polytetrafluoroethylene sheet and dried for 12 hours at room temperature, and then dried further for 6 hours at 60° C., after which the sheet was peeled off to create a resin film of 500 μm in film thickness constituted by the water-dispersible urethane resin.

Using a tensile tester (manufactured by Yasuda Seiki Seisakusho, Co., Ltd.), and at a measurement temperature of 25° C. and pulling rate of 200 mm/min, the obtained resin film was pulled until fracture, upon which the corresponding strength and elongation were measured.

The water-dispersible urethane resin having such physical properties may be NeoRez R967 (polyether polyurethane) manufactured by DSM, Co., Ltd., TAKELAC WS-5000 manufactured by Mitsui Chemicals, Co., Ltd., or Impranil DLH manufactured by Sumika Covestro Urethane, Co., Ltd.

Additionally, the water-dispersible urethane resin must be contained by 1.0 to 3.0 parts by mass relative to 1 part by mass of the pigment.

If the content is less than 1.0 part by mass, washing fastness will drop. If it exceeds 3.0 parts by mass, on the other hand, post-cure texture will become poor.

Under the present invention, preferably only one type of water-dispersible urethane resin is used. Even when two or more types are used, all the resins must satisfy the physical properties described in the present invention.

It should be noted that, to the extent that the effects of the present invention will be demonstrated, other resins may be used along with the water-dispersible urethane resin described in the present invention.

<Crosslinking Agent>

For the crosslinking agent under the present invention, at least one type selected from blocked isocyanate compounds, carbodiimide compounds, oxazoline group-containing polymers, epoxy compounds, formaldehyde adducts of urea, melamine, benzoguanamine, etc., multifunctional aziridine compounds, and others, may be used. Moreover, among these, a blocked isocyanate compound, carbodiimide compound or oxazoline group-containing polymer is preferred.

Furthermore, a crosslinking agent which is dispersed, emulsified, or dissolved in water, or which can be dispersed, emulsified, and/or dissolved in water, is particularly preferred.

Also, under the present invention, the crosslinking agent must be contained by 0.02 to 0.15 parts by mass, but it may be contained by preferably 0.03 to 0.13 parts by mass, relative to 1 part by mass of the water-dispersible urethane resin.

If the content is less than 0.02 parts by mass, washing fastness will drop. If it exceeds 0.15 parts by mass, on the other hand, post-cure texture will become poor.

Blocked isocyanate compounds used as crosslinking agents under the present invention are polyisocyanate compounds whose active isocyanate groups have been reacted with a phenol or other blocking agent and made inactive. Blocked isocyanate compounds, in as-is condition, cannot cause crosslinking reaction and remain chemically stable, but they will be able to cause crosslinking reaction once the blocking groups bonded with the isocyanate groups are dissociated through heat treatment, etc., and active isocyanate groups are formed.

The compound that constitutes the polyisocyanate part of a blocked isocyanate compound is preferably a diisocyanate compound, triisocyanate compound, or polyisocyanate compound, such as hexamethylene diisocyanate, trimethyl hexamethylene diisocyanate, hexamethylene triisocyanate, lysine ester triisocyanate, isophorone diisocyanate, hydrogenated xylylene diisocyanate, toluene diisocyanate, xylene diisocyanate, diphenyl methane diisocyanate, etc. Among these, a triisocyanate compound, such as a tris-biuret-modified product of hexamethylene diisocyanate or other modified hexamethylene diisocyanate is more preferred.

Such compound that constitutes the polyisocyanate part may be a polyisocyanate compound having two or more isocyanate groups per molecule, examples of which include diisocyanate compounds, triisocyanate compounds, tetraisocyanate compounds, pentaisocyanate compounds, hexaisocyanate compounds, and various types of polyisocyanate compounds. Specific examples of polyisocyanate compounds include: tolylene diisocyanate, xylylene diisocyanate, diphenyl methane diisocyanate, biphenyl diisocyanate, 3,3'-dimethyl-4,4'-biphenylene diisocyanate, methylene bis (phenyl isocyanate), isophorone diisocyanate, and other aromatic polyisocyanates; hydrogenated tolylene diisocyanate, hydrogenated xylylene diisocyanate, hydrogenated diphenyl methane diisocyanate, and other alicyclic polyisocyanates; 1,4-tetramethylene diisocyanate, hexamethylene diisocyanate, 2,2,4-trimethyl hexamethylene diisocyanate, and other aliphatic polyisocyanates; and the like. One type of polyisocyanate compound may be used, or multiple types of polyisocyanate compounds may be used, to constitute the blocked isocyanate compound pertaining to this embodiment. From the viewpoint of minimizing an outflow of adhesive, preferably the polyisocyanate compound that constitutes the blocked isocyanate compound pertaining to this embodiment contains a triisocyanate compound.

The blocking agent pertaining to the blocked isocyanate compound is not limited in any way. Besides a phenol as mentioned above, a cresol, ethyl phenol, butyl phenol, 2-hydroxy pyridine, dimethyl malonate, diethyl malonate, methyl acetoacetate, ethyl acetoacetate, acetyl acetone, butyl mercaptan, dodecyl mercaptan, acetanilide, amide acetate, ε-caprolactam, δ-valerolactam, γ-butyrolactam, imide succinate, imide maleate, imidazole, 2-methyl imidazole, urea, thiourea, ethylene urea, formaldoxime, acetaldoxime, acetone oxime, methyl ethyl ketoxime, methyl isobutyl ketoxime, cyclohexanone oxime, carbazole, dimethyl pyrazole, triazole, etc., may be used. One type of blocking agent may be used, or multiple types of blocking agents may be used, to constitute the blocked isocyanate compound pertaining to this embodiment. Additionally, how a blocking agent is combined with a polyisocyanate compound is not limited in any way, in that there may be multiple combinations thereof and that the blocked isocyanate compound pertaining to this embodiment may be constituted by multiple types of compounds.

Preferably the blocked isocyanate compound is of thermal decomposition type. When it is of thermal decomposition type, the temperature at which the reaction to dissociate the blocking agent, or specifically the deblocking reaction, becomes prominent (hereinafter referred to as "deblocking temperature") can be adjusted based on the type of the blocking agent, type of the polyisocyanate compound to be blocked, and so on. While the specific level of this deblocking temperature is not limited in any way, assume that this temperature is 70 to 130° C., for example; in this case, the white inkjet ink composition for textile printing that contains a blocked isocyanate compound having such deblocking temperature will have a low, or virtually zero, crosslinking point density before crosslinking. However, the crosslinking density can be increased by promoting the crosslinking reaction to form crosslinked structures.

Preferably the carbodiimide compound is one having two or more carbodiimide groups, examples of which include, for example: poly(4,4'-diphenyl methane carbodiimide), poly(p-phenylene carbodiimide), poly(m-phenylene carbodiimide), poly(diisopropyl phenyl carbodiimide), poly(triisopropyl phenyl carbodiimide), and other aromatic polycarbodiimides; poly(dicyclohexyl methane carbodiimide) and other alicyclic polycarbodiimides; and poly(diisopropyl carbodiimide) and other aliphatic polycarbodiimides; and the like. The functional group in the aforementioned urethane resin that reacts with the functional group contained in the aforementioned carbodiimide compound may be a carboxyl group, for example.

Furthermore, a carbodiimide compound containing average 3 to 20, or preferably average 4 to 8 carbodiimide constitutional units per molecule, is preferred.

Such carbodiimide compound may be blended, in some cases, with, for example, a monofunctional isocyanate (such as stearyl isocyanate, phenyl isocyanate, butyl isocyanate, or hexyl isocyanate) and/or high-functional isocyanate (such as a trimer of any of the diisocyanates mentioned below, uretdione, allophanate, or biuret), and is obtained by carbodiimidizing a diisocyanate (such as tetramethylene diisocyanate, methyl pentamethylene diisocyanate, hexamethylene diisocyanate, dodecamethylene diisocyanate, 1,4-diisocyanato cyclohexane, 1-i socyanato-3,3,5-trimethyl-5-i socyanato methyl cyclohexane, 4,4'-diisocyanato dicyclohexyl methane, 4,4'-diisocyanato dicyclohexyl propane-(2,2), 1,4-diisocyanato benzene, 2,4-diisocyanato toluene, 2,6-diisocyanato toluene, 4,4'-diisocyanato diphenyl methane, 2,2'-diisocyanato diphenyl methane, 2,4'-diisocyanato diphenyl methane, tetramethyl xylylene diisocyanate, p-xylylene diisocyanate, or p-isopropylidene diisocyanate), concurrently or before/after reacting it with a hydrophilic component (such as an alcohol or monofunctional or bifunctional polyether based on amine-initiated ethylene oxide/propylene oxide copolymer or ethylene oxide polymer).

The oxazoline group-containing polymer may be, for example, a polymer comprising one type, or two or more types, selected from the following, and the like: 2,2'-bis(2-oxazoline), 1,2-bis(2-oxazoline-2-yl)ethane, 1,4-bis(2-oxazoline-2-yl)butane, 1,8-bis(2-oxazoline-2-yl)butane, 1,4-bis (2-oxazoline-2-yl)cyclohexane, 1,2-bis(2-oxazoline-2-yl) benzene, 1,3-bis(2-oxazoline-2-yl)benzene, and other aliphatic or aromatic bis-oxazoline compounds; and 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, and other addition polymerizable oxazolines. Any of these oxazoline group-containing polymers may be used alone, or two or more types may be combined.

Also, the functional group in the water-dispersible urethane resin that reacts with the functional group contained in the oxazoline group-containing polymer may be a carboxyl group, for example.

<Water-soluble Organic Solvent>

Under the present invention, the white inkjet ink composition for textile printing contains a glycol ether that dissolves by 1 to 60 g in 100 g of water, for the purpose of improving coating film resistance, washing fastness, and the like. Here, preferably it dissolves by 3 to 55 g in 100 g of water. For such water-soluble organic solvent, tripropylene glycol-n-butyl ether, dipropylene glycol-n-butyl ether, or dipropylene glycol dimethyl ether may be adopted.

If less than 1 g is dissolved in 100 g of water, or more than 60 g is dissolved in 100 g of water, coating film resistance and washing fastness will deteriorate.

Additionally, the content of such water-soluble organic solvent is preferably 10 percent by mass or less, or more preferably 5 percent by mass or less, or yet more preferably 3 percent by mass or less, in the white inkjet ink composition for textile printing. A content exceeding 10 percent by mass may present problems in terms of viscosity, discharge property, physical properties of the ink coating film, and drying property.

<Pigment>

The white inkjet ink composition for textile printing proposed by the present invention may have titanium oxide, aluminum oxide, etc., blended therein as a white pigment, or it may contain titanium oxide whose surface has been treated with alumina, silica, or any of various other materials.

The blending quantity of white pigment is preferably 1.0 to 20.0 percent by mass, or more preferably 5.0 to 15.0 percent by mass, relative to the white inkjet ink composition for textile printing. If the pigment content is less than 1.0 percent by mass, the image quality of the obtained printed matter tends to drop. If the content exceeds 20 percent by mass, on the other hand, viscosity property of the white inkjet ink composition for textile printing tends to be negatively affected.

Additionally, pigments of respective hues, other than white, may also be contained to adjust the degree of whiteness.

For these pigments of respective hues, any organic pigments, inorganic pigments, or other pigments traditionally used in standard ink compositions for inkjet printing may be used without any particular limitations. Also, resin-coated pigments, each formed by coating an organic or inorganic pigment with a resin layer, may also be adopted.

Organic pigments include, for example, dye lake pigments as well as azo-, benzimidazolone-, phthalocyanine-, quinacridone-, anthraquinone-, dioxazine-, indigo-, thioindigo-, perylene-, perinone-, diketopyrrolopyrrole-, isoindolinone-, nitro-, nitroso-, anthraquinone-, flavanthrone-, quinophthalone-, pyranthrone-, indanthrone-based, other pigments, and the like. Inorganic pigments include carbon black, titanium oxide, red iron oxide, graphite, iron black, chrome oxide green, aluminum hydroxide, etc.

Also, specific examples of pigments of representative hues that can be blended into the white inkjet ink compositions for textile printing proposed by the present invention, are as follows.

First, yellow pigments include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., where preferred choices include C. I. Pigment Yellow 13, 14, 17, 74, 155, 213, etc.

Magenta pigments include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., where preferred choices include C. I. Pigment Red 122, 202, C. I. Pigment Violet 19, etc.

Cyan pigments include, for example, C. I. Pigment Blue 1, 2, 3, 15, 15:1, 15:2, 15:3, 15:4, 15:6, 16, 18, 22, 27, 29, 60, etc., where preferred choices include C. I. Pigment Blue 15:3, etc.

Black pigments include, for example, carbon black (C. I. Pigment Black 7), etc.

White pigments for using the present invention as a white inkjet ink composition for textile printing include, for example, titanium oxide, aluminum oxide, etc., where preferred choices include titanium oxides whose surface has been treated with alumina, silica, and various other materials.

<Pigment Dispersant>

Also, the white inkjet ink composition for textile printing proposed by the present invention may further contain a pigment dispersant, as necessary.

A pigment dispersant is used to further improve the dispersibility of pigment and the preservation stability of the ink composition proposed by the present invention, and although any of traditionally-used pigment dispersants may be used without any particular limitations, use of a polymeric dispersant and the like is preferred. Such pigment dispersants include carbodiimide dispersants, polyester amine dispersants, aliphatic amine dispersants, modified polyacrylate dispersants, modified polyurethane dispersants, multi-chain polymeric nonionic dispersants, polymeric ionic activators, and the like. Any of these pigment dispersants may be used alone, or two or more types may be combined.

In particular, use of an acrylic acid/lauryl acrylate/styrene copolymer, as an anionic group-containing resin, is preferred.

Preferably the aforementioned pigment dispersant is contained by 1 to 200 parts by mass when the total pigment quantity used represents 100 parts by mass. If the content of pigment dispersant is less than 1 part by mass, the dispersibility of pigment, and the storage stability of the ink composition proposed by the present invention, may drop. On the other hand, adjusting the content to exceed 200 parts by mass, although possible, may not lead to any difference in the effects. A more preferable lower limit, and a more preferable upper limit, of the content of pigment dispersant, are 5 parts by mass and 60 parts by mass, respectively.

<Surface-active Agent>

Preferably the white inkjet ink composition for textile printing proposed by the present invention contains, according to the inkjet head to be used, a silicone or acetylene diol surface-active agent or other surface-active agent which is traditionally used in inkjet ink compositions as a surface-active agent, in order to improve discharge stability.

Specific examples of silicone surface-active agents include polyether-modified silicone oil, polyester-modified polydimethyl siloxane, polyester-modified methyl alkyl polysiloxane, and the like. Any of these may be used alone, or two or more types may be combined.

Specific examples of acetylene diol surface-active agents include Surfynol 104E, Surfynol 104H, Surfynol 104A, Surfynol 104BC, Surfynol 104DPM, Surfynol 104PA, Surfynol 104PG-50, Surfynol 420, and Surfynol 440 manufactured by Air Products, Olfine E1004, Olfine E1010, Olfine E1020, Olfine PD-001, Olfine PD-002W, Olfine PD-004, Olfine PD-005, Olfine EXP.4001, Olfine EXP.4200, Olfine EXP.4123, and Olfine EXP. 4300 manufactured by Nissin Chemical Industry, Co., Ltd., and the like. Any of these may be used alone, or two or more types may be combined.

Preferably the content of surface-active agent in the ink composition proposed by the present invention is 0.005 to 1.0 percent by mass. If the content is less than 0.005 percent by mass, the surface tension of the white inkjet ink composition for textile printing proposed by the present invention will increase, and therefore the stability of its discharge from the inkjet head will drop. If the content exceeds 1.0 percent by mass, on the other hand, bubbles will increase in the white inkjet ink composition for textile printing and its discharge stability will drop as a result.

<Additives>

Various additives may be added to the white inkjet ink composition for textile printing proposed by the present invention, as necessary, to manifest various functionalities. Specific examples include photostabilizers, surface treatment agents, antioxidants, antiaging agents, crosslinking promoters, plasticizers, preservatives, pH adjusting agents, defoaming agents, moisturizing agents, etc. Also, non-curable resins that function as vehicles may or may not be blended in.

The method for preparing the ink composition proposed by the present invention is not limited in any way, and any traditionally known method for obtaining ink compositions for printing or ink compositions for textile printing may be adopted.

To be specific, a method whereby an anionic group-containing resin is dissolved in an aqueous alkaline solution beforehand, and then a pigment is added thereto and the mixture is kneaded, may be adopted.

The methods for printing and curing the white inkjet ink composition for textile printing proposed by the present invention specifically include one whereby the ink composition proposed by the present invention is discharged onto a base material from an inkjet head, after which the coating film of the ink composition proposed by the present invention that has landed on the base material is heated and thus cured.

For example, the ink composition proposed by the present invention may be discharged onto the base material (printing of images) by means of supplying it to a low-viscosity printer head of an inkjet recording printer and discharging the ink composition from the printer head so that the thickness of the coating film on the base material becomes 1 to 60 µm, for example.

For the printer device for inkjet recording with which to print the white inkjet ink composition for textile printing proposed by the present invention, any traditionally-used printer device for inkjet recording may be utilized.

For the device used for heating and curing, any known device for curing thermally-curable ink compositions may be adopted. The heat source may be an infrared light, electrically-heated wire, iron, or other device that heats a material by directly contacting the material, or a device that uses irradiation from an infrared lamp or electrically-heated wire or other heating source that does not directly contact the material.

<Fabrics>

Base materials to be printed with the white inkjet ink composition for textile printing proposed by the present invention may be any traditionally-used fabrics; for example, fabrics made of cotton, silk, linen, rayon, acetate, nylon, or polyester fibers, or mixed fabrics made of two or more types of fibers selected from the foregoing, may be used.

EXAMPLES

Preparation of White Inkjet Ink Compositions for Textile Printing

The present invention is explained in greater detail below using examples; however, the present invention is not limited to these examples. It should be noted that, unless otherwise specified, "%" means "percent by mass," while "part(s)" means "part(s) by mass."

The materials used in the Examples and Comparative Examples below are as follows.

TABLE 1

|  | Product name (Manufactured by) | Reactivity to cations | Solid content (% by weight) | Fracture elongation (%) | Tensile strength (MPa) |
|---|---|---|---|---|---|
| Water-dispersible urethane resin (1) | NeoRez R-967 (DSM, Co., Ltd.) | Yes | 40 | 600 | 19.6 |
| Water-dispersible urethane resin (2) | TAKELAC WS-5000 (Mitsui Chemicals, Co., Ltd.) | Yes | 30 | 560 | 60 |
| Water-dispersible urethane resin (3) | Impranil DLH (Sumika Covestro Urethane, Co., Ltd.) | Yes | 40 | 1100 | 50 |
| Water-dispersible urethane resin (4) | Superflex 500M (DKS Co. Ltd.) | No | 45 | 1100 | 18 |
| Water-dispersible urethane resin (5) | Baybond PU407 (Sumika Covestro Urethane, Co., Ltd.) | No | 40 | 1200 | 40 |

TABLE 2

|  | Product name (Manufactured by) | Structure | Solid content (% by weight) |
|---|---|---|---|
| Crosslinking agent (1) | Bayhydur BL2867 (Sumika Covestro Urethane, Co., Ltd.) | Blocked isocyanate compound | 38 |
| Crosslinking agent (2) | CARBODILITE SV-02 (Nisshinbo Chemical, Co., Ltd.) | Carbodiimide compound | 40 |
| Crosslinking agent (3) | EPOCROS WS-700 (Nippon Shokubai, Co., Ltd.) | Oxazoline group-containing polymer | 25 |

TABLE 3

| Glycol ether | | Quantity dissolved in 100 g of water |
|---|---|---|
| TPnB | Tripropylene glycol-n-butyl ether | 3 |
| DPnB | Dipropylene glycol-n-butyl ether | 19 |
| DMM | Dipropylene glycol dimethyl ether | 53 |
| BDB | Diethylene glycol dibutyl ether | 0.3 |
| TPM | Tripropylene glycol methyl ether | >100 |

(Preparation of Aqueous Resin Varnish)

Twenty-five parts by mass of the below-mentioned anionic group-containing resin were dissolved in a mixed liquid of 4.9 parts by mass of potassium hydroxide and 70.1 parts by mass of water, to obtain an aqueous resin varnish of 25 percent by mass in solid content of anionic group-containing resin.

Anionic group-containing resin: Acrylic acid/lauryl acrylate/styrene copolymer (weight-average molecular weight 30000, acid value 185 mg KOH/g)

(Preparation of Pigment Dispersion Liquid)

To 36 parts by mass of the aforementioned aqueous resin varnish, 19 parts by mass of water were added and the ingredients were mixed, to prepare a resin varnish for pigment dispersion. To this resin varnish for pigment dispersion, 45 parts by mass of CR-90 (titanium oxide, manufactured by Ishihara Sangyo Kaisha, Co., Ltd.) were added further as a pigment and the ingredients were mixed under agitation, after which the mixture was kneaded using a wet circulation mill, to prepare a pigment dispersion liquid.

(Preparation of White Inkjet Ink Compositions for Textile Printing)

To the aforementioned pigment dispersion liquid, water-dispersible urethane resins, crosslinking agents, water, water-soluble organic solvents (glycerin, 2-pyrrolidone, glycol ethers), and surface-active agents (Olfine E1010, Surfynol 440) were added to prepare white inkjet ink compositions for textile printing.

(Preparation of Pretreatment Solution for Inkjet Textile Printing)

Ten parts by mass of a calcium nitrate tetrahydrate, 6.0 parts by mass of a nonionic styrene-acrylic self-crosslinkable resin emulsion with a glass transition temperature of −30° C. (product name: Mowinyl 966A, manufactured by Japan Coating Resin, Co., Ltd., solid content 45%), and 0.3 parts by mass of ACETYLENOL E100 (HLB 13.5, ethylene oxide adduct of acetylene glycol, manufactured by Kawaken Fine Chemicals, Co., Ltd.) were added to 83.7 parts by mass of water, and the mixture was agitated to obtain a pretreatment solution for inkjet textile printing.

(Methods for Pretreatment and Production of Printed Matter)

A black fabric made of 100% cotton was impregnated with 10 g of the aforementioned treatment solution per A4 size area, and then dried by heating.

The obtained pretreated black fabric was printed by solid printing in a manner overlapping four times with each of the white inkjet ink compositions for textile printing in Examples 1 to 9 and Comparative Examples 1 to 8 using an evaluation printer equipped with a head manufactured by SPECTRA.

Thereafter, a heat-press machine was used to heat the printed area at 170° C. for 1 minute, thereby fixing the white inkjet ink composition for textile printing on the fabric and thus obtaining each of the printed fabrics in Examples 1 to 9 and Comparative Examples 1 to 8.

(Evaluation Methods)

(Image Density)

The luminance (L*) of each printed fabric was measured using a spectrophotometer (SpectroEye, manufactured by X-Rite).

⊙: L*=80 or higher
○: L*=70 or higher, but lower than 80
Δ: L*=50 or higher, but lower than 70
x: L*=Lower than 50

(Coating Film Resistance)

Each printed fabric was stretched five times (stretched to its limit each time), and then visually evaluated for cracking and peeling of the coating film.

⊙: The coating film does not crack or peel.
○: The coating film does not peel, but cracks slightly.
Δ: The coating film does not peel, but cracks.
x: The coating film cracks and peels.

(Texture)

Each printed fabric was evaluated by touch.

⊙: The printed fabric creases easily, preserving softness close to that of the original 100% cotton black fabric.
○: The printed fabric creases easily, but a little more roughness is felt compared to the original black fabric.
Δ: The printed fabric feels rough.
x: The printed fabric is so stiff that it does not crease freely.

(Washing Fastness)

The luminance (L*) of each printed fabric was measured using a spectrophotometer (SpectroEye, manufactured by X-Rite) before and after the fabric was washed five times normally (washing conditions: wash in a standard mode→spin→dry) with a home washing machine, and the rate of change from the initial value before washing was evaluated.

⊙: The image density remains equal to or higher than 90% of the initial value after washing.
○: The image density remains equal to or higher than 80%, but is lower than 90%, of the initial value after washing.
Δ: The image density remains equal to or higher than 70%, but is lower than 80%, of the initial value after washing.
x: The image density is lower than 70% of the initial value after washing.

TABLE 4

| | Examples | | | | | | | | |
|---|---|---|---|---|---|---|---|---|---|
| | 1 | 2 | 3 | 4 | 5 | 6 | 7 | 8 | 9 |
| Pigment dispersion liquid | 22.0 | 22.0 | 22.0 | 22.0 | 22.0 | 22.0 | 22.0 | 22.0 | 22.0 |
| Water-dispersible urethane resin (1) | 30.0 | 30.0 | 30.0 | 30.0 | 30.0 | 30.0 | 30.0 | | |
| Water-dispersible urethane resin (2) | | | | | | | | 40.0 | |

TABLE 4-continued

|  | | | | | | | | | |
|---|---|---|---|---|---|---|---|---|---|
| Water-dispersible urethane resin (3) | | | | | | | | | 30.0 |
| Water-dispersible urethane resin (4) | | | | | | | | | |
| Water-dispersible urethane resin (5) | | | | | | | | | |
| Crosslinking agent (1) | 1.0 | 1.0 | 1.0 | 3.2 | 4.1 | | | 1.0 | 1.0 |
| Crosslinking agent (2) | | | | | | 0.9 | | | |
| Crosslinking agent (3) | | | | | | | 1.4 | | |
| Olfine E1010 | 0.2 | 0.2 | 0.2 | 0.2 | 0.2 | 0.2 | 0.2 | 0.2 | 0.2 |
| Surfynol 440 | 0.5 | 0.5 | 0.5 | 0.5 | 0.5 | 0.5 | 0.5 | 0.5 | 0.5 |
| Glycerin | 15.0 | 15.0 | 15.0 | 15.0 | 15.0 | 15.0 | 15.0 | 15.0 | 15.0 |
| 2-pyrrolidone | 10.0 | 10.0 | 10.0 | 10.0 | 10.0 | 10.0 | 10.0 | 10.0 | 10.0 |
| TPnB | 1.0 | | | 1.0 | 1.0 | 1.0 | 1.0 | 1.0 | 1.0 |
| DPnB | | 1.0 | | | | | | | |
| DMM | | | 1.0 | | | | | | |
| BDB | | | | | | | | | |
| TPM | | | | | | | | | |
| Water | 20.3 | 20.3 | 20.3 | 18.1 | 17.2 | 20.4 | 19.9 | 10.3 | 20.3 |
| Total | 100.0 | 100.0 | 100.0 | 100.0 | 100.0 | 100.0 | 100.0 | 100.0 | 100.0 |
| Crosslinking agent quantity relative to resin (ratio by mass) | 0.03 | 0.03 | 0.03 | 0.10 | 0.13 | 0.03 | 0.03 | 0.03 | 0.03 |
| Evaluation results | | | | | | | | | |
| Image density | ⊚ | ⊚ | ⊚ | ⊚ | ⊚ | ⊚ | ⊚ | ⊚ | ⊚ |
| Coating film resistance | ⊚ | ⊚ | ⊚ | ⊚ | ⊚ | ⊚ | ⊚ | ⊚ | ⊚ |
| Texture | ⊚ | ⊚ | ⊚ | ○ | ○ | ⊚ | ⊚ | ⊚ | ⊚ |
| Washing fastness | ⊚ | ⊚ | ⊚ | ⊚ | ⊚ | ⊚ | ⊚ | ⊚ | ⊚ |

| | Comparative Examples | | | | | | | |
|---|---|---|---|---|---|---|---|---|
| | 1 | 2 | 3 | 4 | 5 | 6 | 7 | 8 |
| Pigment dispersion liquid | 22.0 | 22.0 | 22.0 | 22.0 | 22.0 | 22.0 | 22.0 | 22.0 |
| Water-dispersible urethane resin (1) | 30.0 | 30.0 | 30.0 | | | 30.0 | 30.0 | 30.0 |
| Water-dispersible urethane resin (2) | | | | | | | | |
| Water-dispersible urethane resin (3) | | | | | | | | |
| Water-dispersible urethane resin (4) | | | | 27.0 | | | | |
| Water-dispersible urethane resin (5) | | | | | 30.0 | | | |
| Crosslinking agent (1) | 1.0 | 1.0 | 1.0 | 1.0 | 1.0 | | 0.3 | 6.3 |
| Crosslinking agent (2) | | | | | | | | |
| Crosslinking agent (3) | | | | | | | | |
| Olfine E1010 | 0.2 | 0.2 | 0.2 | 0.2 | 0.2 | 0.2 | 0.2 | 0.2 |
| Surfynol 440 | 0.5 | 0.5 | 0.5 | 0.5 | 0.5 | 0.5 | 0.5 | 0.5 |
| Glycerin | 15.0 | 15.0 | 15.0 | 15.0 | 15.0 | 15.0 | 15.0 | 15.0 |
| 2-pyrrolidone | 10.0 | 10.0 | 10.0 | 10.0 | 10.0 | 10.0 | 10.0 | 10.0 |
| TPnB | | | | 1.0 | 1.0 | 1.0 | 1.0 | 1.0 |
| DPnB | | | | | | | | |
| DMM | | | | | | | | |
| BDB | | 1.0 | | | | | | |
| TPM | | | 1.0 | | | | | |
| Water | 21.3 | 20.3 | 20.3 | 23.3 | 20.3 | 21.3 | 21.0 | 15.0 |
| Total | 100.0 | 100.0 | 100.0 | 100.0 | 100.0 | 100.0 | 100.0 | 100.0 |
| Crosslinking agent quantity relative to resin (ratio by mass) | 0.03 | 0.03 | 0.03 | 0.03 | 0.03 | 0.00 | 0.01 | 0.20 |
| Evaluation results | | | | | | | | |
| Image density | ⊚ | ⊚ | ⊚ | X | Δ | ⊚ | ⊚ | ⊚ |
| Coating film resistance | Δ | Δ | Δ | X | X | Δ | Δ | ○ |
| Texture | ⊚ | ⊚ | ⊚ | Δ | Δ | ⊚ | ⊚ | Δ |
| Washing fastness | Δ | Δ | Δ | X | X | Δ | Δ | ○ |

The Examples conforming to the present invention resulted in particularly high image density, sufficient washing fastness, as well as good coating film resistance and texture.

By contrast, Comparative Example 1 containing no glycol ether that dissolves by 1 to 60 g in 100 g of water, and Comparative Examples 2 and 3 blended only with an organic solvent that does not dissolve by 1 to 60 g, resulted in poor coating film resistance and washing fastness.

Furthermore, Comparative Examples 4 and 5 using a water-dispersible urethane resin having no reactivity to cationic compounds, turned out poor in all of image density, coating film resistance, texture, and washing fastness.

Also, Comparative Example 6 not blended with any crosslinking agent resulted in poor coating film resistance and washing fastness. Additionally, Comparative Example 7 using less crosslinking agent resulted in poor coating film resistance and washing fastness, while Comparative Example 8 using too much crosslinking agent led to texture deterioration.

What is claimed is:

1. A white inkjet ink composition for textile printing, containing a white pigment, a water-dispersible urethane resin having reactivity to cationic compounds, at least one type of crosslinking agent selected from a group consisting of blocked isocyanate compounds and carbodiimide compounds, a water-soluble organic solvent, and water; wherein the crosslinking agent is contained by 0.02 to 0.15 parts by mass relative to 1 part by mass of the water-dispersible urethane resin, and as the water-soluble organic solvent, tripropylene glycol-n-butyl ether is contained.

* * * * *